(12) United States Patent
Nadeau

(10) Patent No.: US 6,674,962 B2
(45) Date of Patent: Jan. 6, 2004

(54) LIMITED-POOL RANDOM FREQUENCY FOR DC BRUSH MOTOR LOW FREQUENCY PWM SPEED CONTROL

(75) Inventor: Sylvain Nadeau, London (CA)

(73) Assignee: Siemens VDO Automotive, Inc., Mississauga (CA)

(*) Notice: Subject to any disclaimer, the term of this patent is extended or adjusted under 35 U.S.C. 154(b) by 68 days.

(21) Appl. No.: 10/059,709

(22) Filed: Jan. 29, 2002

(65) Prior Publication Data

US 2003/0142963 A1 Jul. 31, 2003

(51) Int. Cl.[7] ................................................. H02P 5/06
(52) U.S. Cl. ........................ 388/804; 388/800; 388/803
(58) Field of Search ................................. 386/804, 829, 386/831, 832, 800; 318/254, 138, 439, 599; 388/803

(56) References Cited

U.S. PATENT DOCUMENTS

| | | |
|---|---|---|
| 3,651,460 A | 3/1972 | Gebelein |
| 3,983,464 A | 9/1976 | Peterson |
| 4,516,065 A | 5/1985 | Ninomiya et al. |
| 5,034,668 A | 7/1991 | Bausch |
| 5,162,709 A | 11/1992 | Ohi |
| 5,210,474 A | 5/1993 | Oswald |
| 5,256,951 A | 10/1993 | Nashiki et al. |
| 5,300,866 A | 4/1994 | Yasohara et al. |
| 5,492,273 A | 2/1996 | Shah |
| 5,589,805 A * | 12/1996 | Zuraski et al. ............... 332/109 |
| 5,592,058 A | 1/1997 | Archer |
| 5,739,658 A | 4/1998 | Thompson |
| 5,760,359 A | 6/1998 | Nakano et al. |
| 5,811,957 A | 9/1998 | Bose et al. |
| 5,883,478 A | 3/1999 | Thesling |
| 6,107,767 A | 8/2000 | Lu et al. |
| 6,107,776 A * | 8/2000 | Nakazawa ................... 318/811 |
| 6,215,261 B1 * | 4/2001 | Becerra ....................... 318/254 |
| 6,288,517 B1 | 9/2001 | Parker et al. |
| 6,291,949 B1 | 9/2001 | Green |
| 6,414,455 B1 * | 7/2002 | Watson ........................ 318/432 |
| 6,433,507 B1 * | 8/2002 | Makaran et al. ............ 318/811 |

OTHER PUBLICATIONS

Almarri, Khalid Ali, "Random PWM Technique For Induction Motor Drives", Ph.D. Thesis, University Of Arkansas, May 2000, Abstract.

* cited by examiner

Primary Examiner—Robert Nappi
Assistant Examiner—Renata McCloud

(57) ABSTRACT

A motor control system 10 includes an engine cooling module 14 including a DC motor 12. The system includes a switch 18 constructed and arranged to be controlled by a pulse width modulated (PWM) signal 26. The switch 18 is operatively associated with the DC motor to control current to the DC motor and thus control the speed of the DC motor. A controller 20 is operatively associated with the switch. The controller is constructed and arranged to select periods, of a limited-pool of frequencies each being less than 500 Hz, from a pseudo-random sequence of periods and to send the selected periods to the switch, thereby controlling noise and vibration of the module.

18 Claims, 2 Drawing Sheets

| Sequence # | Period (s) | | | | |
|---|---|---|---|---|---|
| 1 to 5 | 0.0033333 | 0.0033333 | 0.0031152 | 0.0032154 | 0.0028169 |
| 6 to 10 | 0.0032154 | 0.0028169 | 0.0033333 | 0.0032154 | 0.0033333 |
| 11 to 15 | 0.0033333 | 0.0029673 | 0.0028169 | 0.0032154 | 0.0032154 |
| 16 to 20 | 0.0028169 | 0.0031152 | 0.0032154 | 0.0028169 | 0.0028169 |
| 21 to 25 | 0.0029673 | 0.0029673 | 0.0031152 | 0.0028169 | 0.0033333 |
| 26 to 30 | 0.0028169 | 0.0029673 | 0.0029673 | 0.0032154 | 0.0028169 |
| 31 to 35 | 0.0028169 | 0.0029673 | 0.0028169 | 0.0029673 | 0.0032154 |
| 36 to 40 | 0.0029673 | 0.0032154 | 0.0032154 | 0.0033333 | 0.0031152 |
| 41 to 45 | 0.0028169 | 0.0032154 | 0.0031152 | 0.0031152 | 0.0032154 |
| 46 to 50 | 0.0033333 | 0.0033333 | 0.0031152 | 0.0028169 | 0.0032154 |

22

LIMITED-POOL RANDOM FREQUENCY FOR DC BRUSH MOTOR LOW FREQUENCY PWM SPEED CONTROL

FIELD OF THE INVENTION

The invention relates to DC brush motors and, more particularly, to the reduction of DC motor noise when a low frequency pulse width modulated (PWM) signal is used for speed control.

BACKGROUND OF THE INVENTION

A low speed frequency PWM signal provides a convenient signal to control the speed of a DC brush motor. However, the low frequency PWM signal creates motor torque fluctuations at the PWM frequency and harmonics that are transmitted to the supporting structure and hence creates noise and vibration. In engine cooling applications, the tones created by the constant low frequency PWM speed control degrade the product sound quality and are hence considered objectionable.

Accordingly, there is a need to improve the sound quality of a DC brush motor when low frequency PWM speed control is employed.

SUMMARY OF THE INVENTION

An object of the invention is to fulfill the need referred to above. In accordance with the principles of the present invention, this objective is achieved by providing a method of controlling speed of a DC brush motor using a low frequency pulse width modulated (PWM) signal. The method provides a limited-pool of frequencies, with each frequency of the limited-pool being less than 500 Hz. A period of each of the frequencies of the limited-pool is determined and a pseudo-random sequence of the periods is created. A period from the pseudo-random sequence of periods is selected and the selected period is used as the period of the PWM signal to control speed of the DC brush motor.

In accordance with another aspect of the invention a motor control system includes an engine cooling module including a DC motor. The system includes a switch constructed and arranged to be controlled by a pulse width modulated (PWM) signal. The switch is operatively associated with the DC motor to control current to the DC motor and thus control the speed of the DC motor. A controller is operatively associated with the switch. The controller is constructed and arranged to select periods, of a limited-pool of frequencies less than 500 Hz, from a pseudo-random sequence of periods and to send the selected periods to the switch, thereby controlling noise and vibration of the module.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
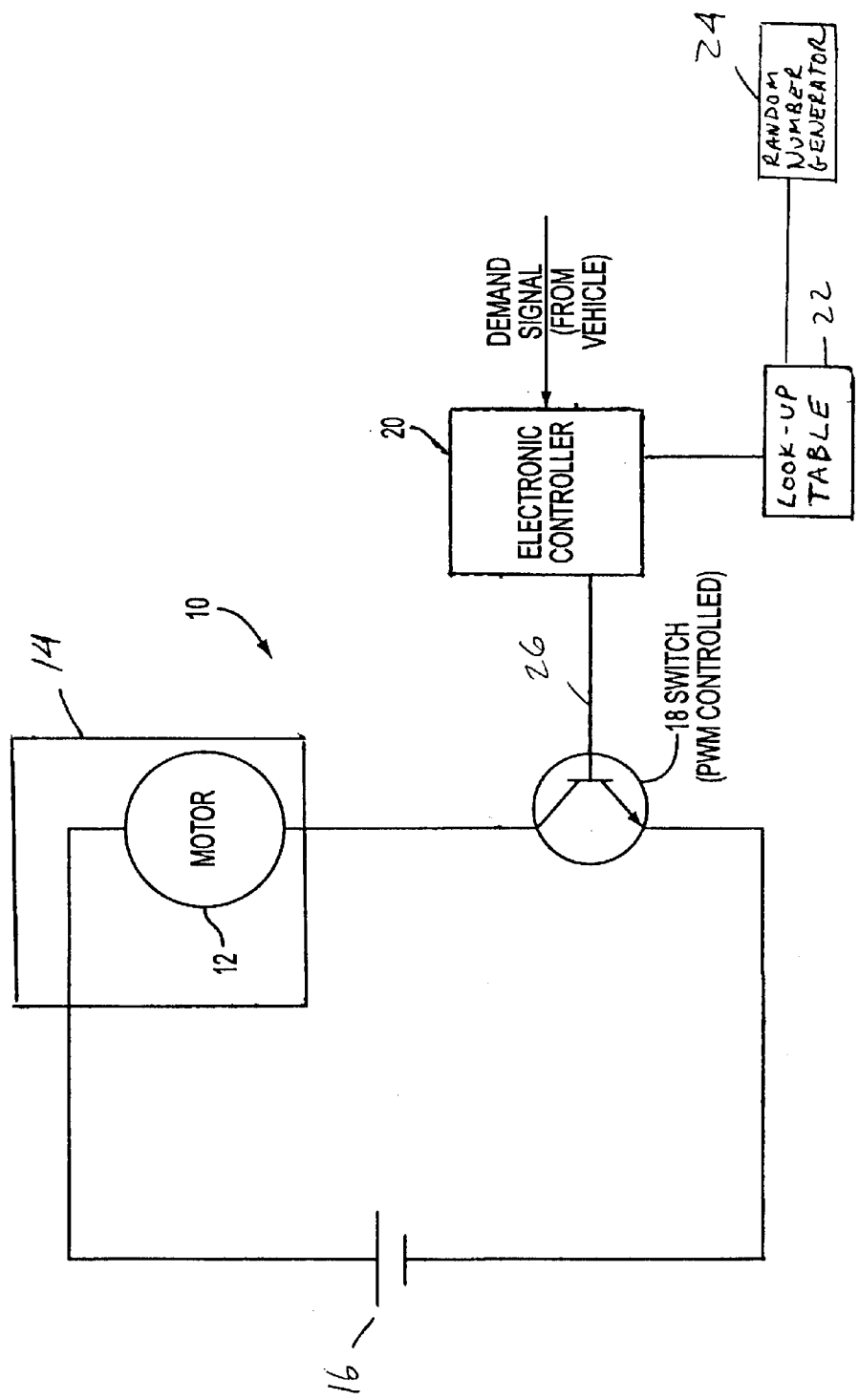
FIG. 1 is a schematic block diagram of an exemplary motor control system provided in accordance with the present invention.

With reference to FIG. 1, an exemplary embodiment of a motor control system, generally indicated at 10, is shown in accordance with the present invention. The motor control system 10, includes a conventional brush-type motor 12 including the typical, stator, winding, and brushes, all of which are not shown since they are well known to one of ordinary skill in the art. The motor 12 is preferably part of an engine cooling module 14 of the type disclosed in, for example, U.S. Pat. No. 5,845,612, the content of which is hereby incorporated into the present specification by reference. A DC power supply 16 is provided, which may be a battery, such as a vehicle battery, or another DC power source.

In accordance with the present invention, the system 10 includes an electronic controller 20 and a PWM controlled switch 18. The electronic controller 20 may include or comprise the vehicle engine control unit. The switch 18 can be a MOSFET device, a bipolar junction transistor, a thyristor, or the like. The operation of the switch 18 is controlled by the electronic controller 20 to control current to the motor 12 to operate the motor 12 at various speeds. The electronic controller includes a central processing unit (CPU). The electronic controller 20 receives a "demand signal" from the vehicle's electrical system and in response to the signal, controls the switch 18.

To reduce DC motor noise, in accordance with the invention, a limited-pool of low frequencies that are typically less than 500 Hz (preferably between 300 Hz and 400 Hz) are employed instead of a constant low PWM frequency. The frequency pool consists of at least two frequencies that are selected based on the noise and vibration response of the module 14.

Using, for example, a pseudo-random number generator, the PWM frequency is changed among the pool frequencies in a random fashion. The frequencies can be changed using a programmed pseudo-random algorithm that calculates the frequency sequence during the PWM operation or by using a look-up table (as in the embodiment) containing a random sequence previously calculated. The random sequence has to be long enough to avoid degrading the sound quality with the sequence repetition frequency. The calculations and operations required by the limited-pool random PWM control strategy can be performed by the electronic controller 20, as in the embodiment, or by the motor drive itself.

Figures 2, 3:
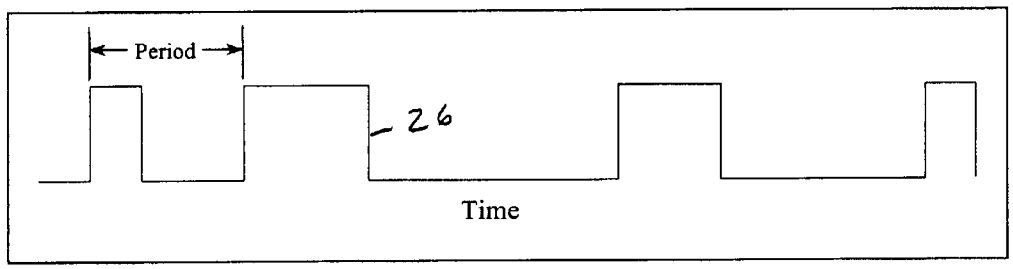
FIG. 2 shows the look-up table of FIG. 1 containing a pseudo-random sequence of periods.
FIG. 3 shows a random PWM signal generated by using a period from the look-up table of FIG. 2.

Thus, with reference to FIGS. 1 and 2, a look-up table 22 is associated with the electronic controller 20. In one embodiment, five frequencies are selected, e.g., 300 Hz, 311 Hz, 321 Hz, 337 Hz and 355 Hz. The respective periods of these frequencies are 0.0033333, 0.0032154, 0.0031152, 0.0029673 and 0.0028169 seconds.

A pseudo-random number generator 24 is used to organize the five periods into the look-up table 22 (FIG. 2) of, for example, fifty values. Thus, the periods are arranged in a pseudo-random sequence. With reference to FIG. 3, a random PWM signal 26 is generated by the controller 20 using a period selected from the look-up table 22. The controller 20 thus retrieves, in sequence, the PWM periods from the table 22 and sends them to the switch 18.

Thus, in accordance with a method of the invention, a limited pool of frequencies is provided, with each frequency of the limited pool being less than 500 Hz. A period of each of the frequencies of the limited-pool is determined and a pseudo-random sequence of the periods is created. A period is selected from the pseudo-random sequence of periods, and the selected period is used as the period of the PWM signal 26 to control speed of the DC brush motor 12.

As shown in the embodiment of FIG. 3, each period has a different duration for the best sound quality (noise reduction) of the module 14. Alternatively, every few periods can have a different duration.

It can be appreciated that the duty-cycle could be changed slightly for each period in order to compensate for the speed variation caused by the frequency change or in order to keep the motor 12 ON time constant for each period which could reduce the CPU requirements without departing from the spirit of this invention.

In the embodiment of FIG. 2, the periods are stored in table 22 since it is easier to use time instead of frequency in programming the controller 20. However, it can be appreciated that instead of storing the period in the look-up table 22, the frequencies can be stored therein. Thus, in this case, a limited-pool of frequencies is provided, with each frequency of the limited-pool being less than 500 Hz. A pseudo-random sequence of frequencies of the limited-pool is organized, preferably in a look-up table. A frequency is selected from the pseudo-random sequence, and is used as the frequency of the PWM signal 26 to control speed of the DC brush motor 12.

Hence, in accordance with the invention, by using the limited pool of frequencies instead of the conventional constant PWM frequency, motor torque fluctuations and harmonics that are transmitted to the module 14 are advantageously substantially reduced.

Although the speed of the motor 12 will fluctuate slightly upon employing the method of the invention, such speed fluctuation is insignificant in engine cooling operations.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of controlling speed of a DC brush motor using a low frequency pulse width modulated (PWM) signal, the method including:
   providing a limited-pool of frequencies, with each frequency of the limited-pool being less than 500 Hz,
   determining a period of each of the frequencies of the limited-pool,
   creating a pseudo-random sequence of the periods,
   selecting a period from the pseudo-random sequence of periods, and
   using the selected period as the period of the PWM signal to control speed of the DC brush motor,
   wherein at least two different frequencies comprise the limited-pool.

2. The method of claim 1, wherein five different frequencies comprise the limited-pool.

3. The method of claim 2, wherein each of the frequencies of the limited-pool is between 300 Hz and 400 Hz.

4. The method of claim 1, wherein the step of creating the pseudo-random sequence of periods includes organizing the periods pseudo-randomly in a look-up table.

5. The method of claim 4, wherein the step of using the selected period includes employing a controller to retrieve the selected periods in sequence from the look-up table.

6. The method of claim 4, further including using a pseudo-random number generator to create the look-up table.

7. A method of controlling speed of a DC brush motor using a low frequency pulse width modulated (PWM) signal, the method including:
   providing a pseudo-random limited-pool of frequencies, with each frequency of the limited-pool being less than 500 Hz,
   organizing the frequencies of the limited-pool into a pseudo-random sequence frequencies,
   selecting a frequency from the pseudo-random sequence, and
   using the selected frequency as the frequency of the PWM signal to control speed of the DC brush motor,
   wherein at least two different frequencies comprise the limited-pool.

8. The method of claim 7, wherein five different frequencies comprise the limited-pool.

9. The method of claim 8, wherein each of the frequencies of the limited-pool is between 300 Hz and 400 Hz.

10. The method of claim 8, wherein the five frequencies are organized pseudo-randomly into a look-up table.

11. The method of claim 10, further including using a pseudo-random number generator to create the look-up table.

12. The method of claim 7, wherein the step of organizing the pseudo-random sequence of frequencies includes organizing the frequencies pseudo-randomly in a look-up table.

13. The method of claim 12, further including using a pseudo-random number generator to create the look-up table.

14. A motor control system comprising:
   an engine cooling module including a DC motor,
   a switch constructed and arranged to be controlled by a pulse width modulated (PWM) signal, the switch being operatively associated with the DC motor to control current to the DC motor and thus control the speed of the DC motor, and
   a controller operatively associated with the switch, the controller being constructed and arranged to select periods, of a limited-pool of at least two different frequencies each being less than 500 Hz, from a pseudo-random sequence of said periods and to send the selected periods to the switch, thereby controlling noise and vibration of the module.

15. The system of claim 14, further including a look-up table associated with the controller, the look-up table including the pseudo-random sequence of said periods.

16. The system of claim 14, wherein the frequencies are between 300 Hz and 400 Hz.

17. A motor control system comprising:
   an engine cooling module including a DC motor,
   a switch constructed and arranged to be controlled by a pulse width modulated (PWM) signal, the switch being operatively associated with the DC motor to control current to the DC motor and thus control the speed of the DC motor, and
   means for controlling the switch operatively associated with the switch, the means for controlling being constructed and arranged to select periods, of a limited-pool of at least two different frequencies between 300 Hz and 400 Hz, from a pseudo-random sequence of said periods and to send the selected periods to the switch, thereby controlling noise and vibration of the module.

18. The system of claim 17, further including a look-up table associated with the means for controlling, the look-up table including the pseudo-random sequence of said periods.

* * * * *